May 10, 1966

H. P. CASSEL 3,250,128

SAMPLING DEVICE

Filed Oct. 22, 1962

INVENTOR.
HERBERT P. CASSEL

BY *Pennie Edmonds Morton Barrows & Taylor*

ATTORNEYS

May 10, 1966
H. P. CASSEL
3,250,128
SAMPLING DEVICE
Filed Oct. 22, 1962
2 Sheets-Sheet 2
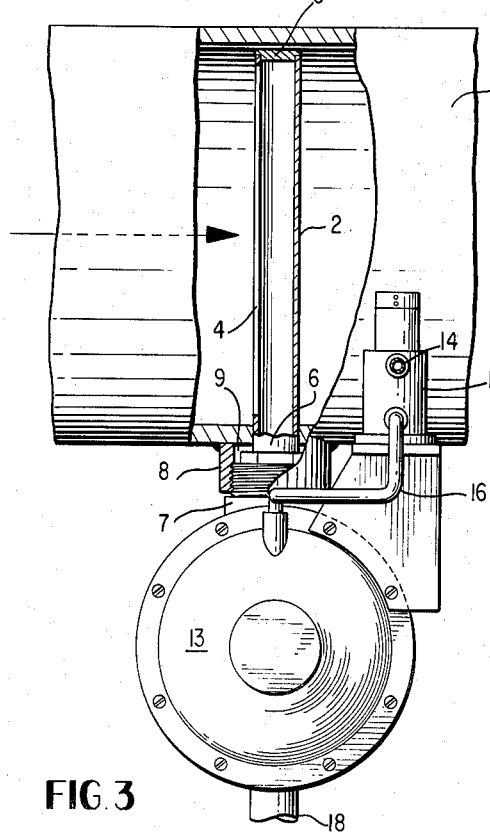
FIG. 3
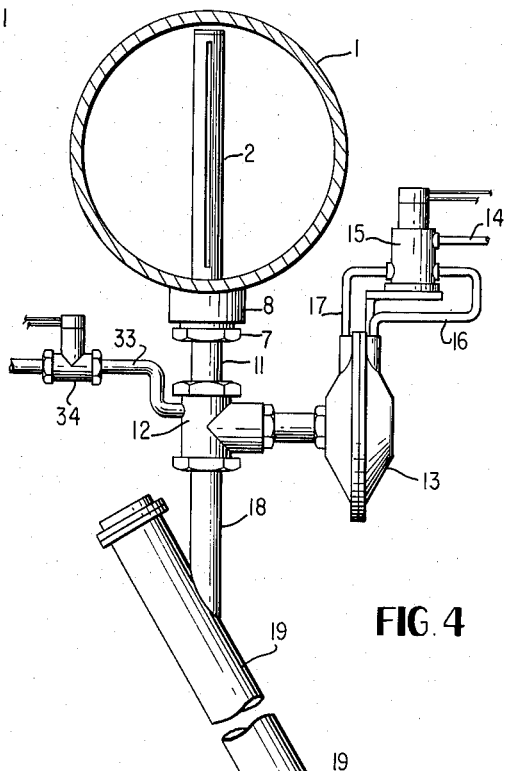
FIG. 4
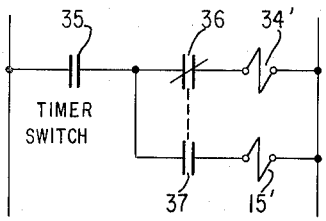
FIG. 5
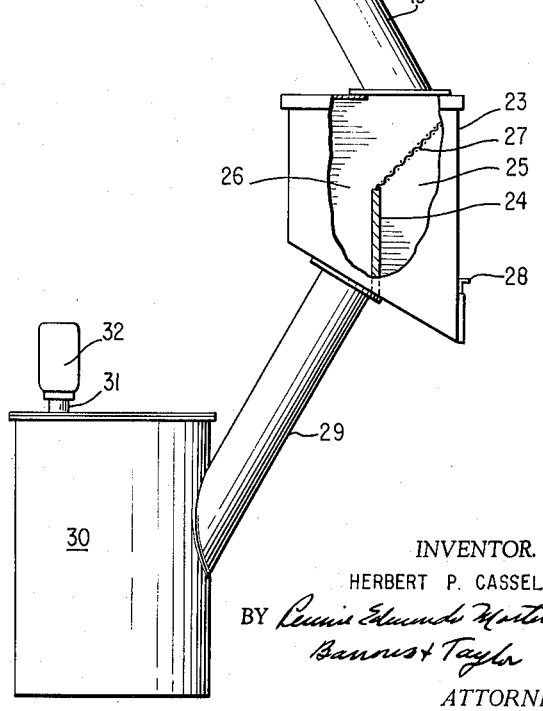
INVENTOR.
HERBERT P. CASSEL
BY
ATTORNEYS

United States Patent Office 3,250,128
Patented May 10, 1966

3,250,128
SAMPLING DEVICE
Herbert P. Cassel, 1350 N. 26th St., Allentown, Pa.
Filed Oct. 22, 1962, Ser. No. 232,041
3 Claims. (Cl. 73—422)

This invention relates to a sampling device for obtaining accurate and representative samples of material flowing through a transport conduit, and more particularly is concerned with a sampling device for sampling discrete particles of solid material entrained in a fluid traveling through a conveying line.

A sample of material should accurately represent the composition of the bulk material being conveyed at the time when the sample is taken. When discrete particles of solid material are being conveyed, it is important that the sample also accurately represent the bulk of material with respect to particle size. It has been found that pulverized or granular material entrained in pneumatic conveying lines tends to vary or stratify, especially in its particle size, across the diameter of the conveying line. Thus, to obtain an accurate sample of such material, the sample must include the material flowing at the center, or longitudinal axis of the conveying line, as well as the material flowing adjacent the walls of the conduit. Preferably the withdrawn sample should include material taken from each point along the diameter of the conduit.

In many cases, flowing material does not suddenly vary in composition or rate of flow. Significant variations in a conduit system usually occur relatively slowly. For example, cement conveyed pneumatically from one operation to the next normally does not vary substantially in a period of a half hour. However, when quality is being closely controlled, any variation from a standard may signal a condition that should be corrected immediately. Thus, the taking of samples at intervals of five minutes or less may be necessary.

The continuous taking of a sample of the material in most instances is not necessary. However, when material is sampled at intervals, and when a sample pick-up or tube is left in the flowing stream of material with the outlet of the tube closed to the flow of material, material will tend to build up in the sampling tube and clog the tube, adversely affecting the taking of the next sample. Also, if the material that builds up in the sampling tube is not removed in some manner, or otherwise separated when a subsequent sample is taken, the subsequent sample will be contaminated with different material and will not be an accurate representation of the material flowing through the transport line when the sample was taken.

For the above reasons, a sampling device must include some provision to prevent clogging if it is to be useful as an intermittent sampler for obtaining an accurate representation of the material flowing through the transport conduit at the time the sample is taken.

Prior devices have attempted, in some instances, to overcome the above objections by shielding the opening in the sampling tube from the material flowing through the transport line when a sample is not being taken. However, this requires some means in the flowing stream for shielding the opening in the sampling tube from the flow of material, and the flow of solid pulverulent particles past such means tends to wear it away, causing it to fail or break down. Also, such means being located in the flowing stream tends to disrupt and impede the free flow of the material stream. For these and other reasons, such apparatus has not proved entirely satisfactory.

In general, the preferred form of sampling device of the present invention comprises a sampling tube extending diametrically across the conveying conduit and having a narrow slot in the wall thereof which faces upstream towards the approaching flowing material. The end of the sampling tube which extends into the conveying line is closed. The other end of the sampling tube extends through the wall of the conveying line and is connected to a discharge conduit having a control valve therein. Since the narrow slot of the sampling tube faces upstream, there is a tendency, when a sample is not being taken, for material to flow through the slot and to accumulate in the sampling tube. To prevent such material from forming a part of a subsequent sample which is taken, means are provided for supplying gas under pressure to the sampling tube to blow all such material out of, or to purge the sampling tube, prior to the taking of a subsequent sample.

The sample of material flowing from the outlet of the control valve is directed by a transfer conduit into a sampling hopper which is divided into a sample compartment and an overflow compartment by a wall extending across the hopper and upwardly from the bottom wall thereof, but which terminates short of the top of the hopper. A filter screen extends across the upper end of the sample compartment and the transfer conduit is directed to discharge material flowing therethrough onto such screen. The screen is arranged at an angle to the horizontal greater than the angle of repose of sample material discharged thereon, so that material of a size too large to pass through the screen will slide downwardly therealong and fall into the overflow compartment. The sample compartment is provided with a door at the lower portion thereof from which the sample of material may be withdrawn. The overflow compartment has an outlet through which excess material may be passed to an overflow bin.

For a better understanding of the invention, reference is made to the accompanying drawings and following description of a preferred embodiment of the invention.

In the drawings:

FIG. 3 is a side elevational view, partly in section, taken at right angles to FIG. 1;

FIG. 4 is an elevational view of the sampling device including the sampling hopper and overflow bin; and FIG. 5 is a schematic diagram of the control circuit for the various valves.

Figure 1:
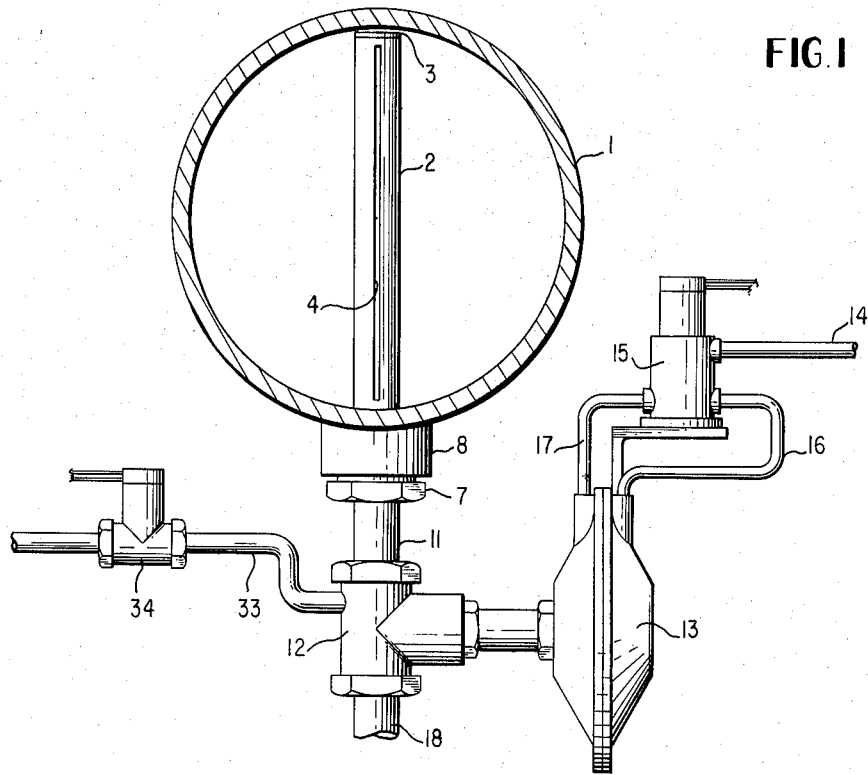
FIG. 1 is a transverse sectional view through a transport line embodying the sampling tube and associated parts of the invention.
Figure 2:
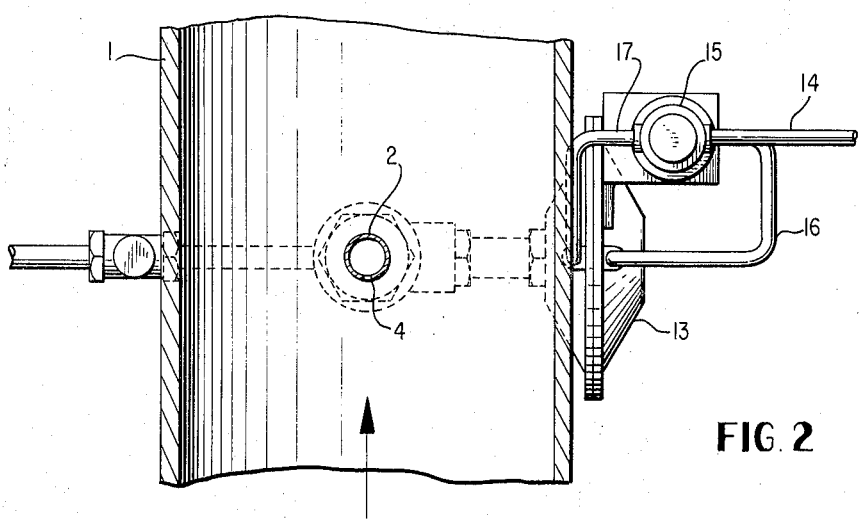
FIG. 2 is a plan view, partly in section, of the transport conduit, sampling tube and control valve.

While the invention, as further described herein, is with respect to the embodiment thereof in a pneumatic conveying system, it is to be understood that the material to be sampled may be any type of material, either fluid or solid, or a fluid carrying discrete particles of solid particles suspended in a liquid or in a gas, such as cement particles entrained in a stream of gas or air flowing through a transport conduit.

As shown in the drawings, a transport conduit 1, such as is used for conveying a suspension of cement in air, has a sampling tube 2 extending diametrically thereacross. Preferably, the sampling tube extends vertically of the transport conduit so that material flowing into the sampling tube will fall down through the tube to be discharged. The end of the sampling tube extending into the transport conduit is closed in any desired manner, preferably by a plug or a disc 3. The sampling tube has a narrow, longitudinally-extending slot 4 in the wall thereof which faces upstream into the flowing material, and through which a sample of material may flow into the sampling tube. The narrow slot 4 extends substantially the full length of the portion of the sampling tube which extends into the transport conduit in order that any sample taken will be representative of the entire material flowing through a conduit, in case there has been any stratification of the material.

The end portion 6 of the sampling tube 2 is disposed outside of the transport conduit and threadedly engages the inner portion of an internally-threaded opening passing through a cap member 7, which in turn is threaded into a collar 8 welded to the lower portion of the transport conduit, about the opening through which the sampling tube extends. Thus the cap member securely supports the sampling tube and also seals a space 9 within the collar 8 between the cap member and the transport conduit. Thus, any slight amount of material that may escape between the sampling tube 2 and the snugly-fitting opening around the sampling tube will be trapped in space 9. One end of a short section of pipe 11 is threaded into the outer portion of the internally-threaded opening passing through the cap member. The other end of pipe 11 is threaded into the inlet opening of a valve 12 which controls the flow of material from the sampling tube.

Control valve 12 preferably is a conventional pneumatically-controlled diaphragm valve, although it may be any other type of valve, including a hand-operated valve, if desired. Fluid under pressure is supplied to the diaphragm housing 13 of the control valve from a supply line 14 through a two-way solenoid-actuated valve 15 and either a closing line 16 or an opening line 17. When the solenoid of valve 15 is not energized, it permits pressurized fluid, such as air, to pass from supply line 14 through the valve and closing line 16 to the outer chamber of the diaphragm housing, biasing the control valve to closed position. When the solenoid of valve 15 is energized, fluid under pressure passes through the valve and open line 17 to the inner chamber of the diaphragm housing 13, biasing the control valve to open position. Thus, simply by energizing the solenoid of valve 15, control valve 12 may be opened to permit a sample of the material flowing through the transport line to be taken. This feature lends itself to the automatic control of the sampling system hereinafter described.

One end portion of a sampled-material pipe 18 extends from the outlet side of the control valve 12 and is connected to a sampled-material duct 19 disposed at an angle and having its lower end portion communicating with the interior of a sample hopper 23.

Sample hopper 23 preferably has its bottom wall inclined so that a sample of material collected therein will naturally tend to flow to one side of the bottom. A wall 24 extends entirely across the sample hopper and upwardly from the bottom of the hopper slightly more than one-half the height of the hopper at the location thereof. This wall divides the hopper into two compartments, a sample compartment 25 and an overflow compartment 26. A filter screen 27 extends from the upper edge of the wall 24 in an upwardly-inclined direction, entirely across the sample compartment, to a side wall of the sample hopper. The filter screen 27 is located beneath the end of the sampled-material duct 19 where it discharges into the sample hopper, so that a sample of material passing through the duct will be discharged onto the screen. The screen 27 is inclined upwardly from the wall 24 at an angle greater than the angle of repose of any material which may be conveyed through the transport conduit 1, so that when a sample of material is discharged onto the screen from the duct 19, any of the material which is too large to pass through the screen and into the sample compartment 25 will flow along and off the screen into the overflow compartment 26.

The filter screen 27 permits only particles of material smaller than the mesh size thereof to pass therethrough into the sample compartment 25. In this manner, a sample of material is collected in the sample compartment which is smaller than a predetermined maximum size. Such sizing is highly desirable for many analyzers. The lower side of the sample compartment has an opening closed by a sliding gate 28 which may be opened when desired to permit withdrawal of a sample of the material collected in the sample compartment. Preferably when a sample is to be taken, the control valve 12 will be maintained open until the sample compartment is filled, to automatically provide a standard volume sample of particles of a predetermined particle size.

Sample material of a size too large to pass through the screen 27 falls to the bottom of the overflow compartment and passes through a conduit 29 into an overflow bin 30. A vent pipe 31 extends from the top of the overflow bin and is capped with a filter bag or dust arrester 32.

When the control valve 12 is opened to take a sample of the gaseous-entrained solid material flowing through the transport conduit 1, the entrained solid particles and entrained gas will pass through the slot 4, pipe 11, valve 12 and conduit 19 into the sample hopper 23, where the solid particles fall onto the screen 27. The small particles pass through the screen and collect in the sample compartment 25, while the oversize particles fall to the bottom of the overflow compartment 26 and pass, along with the entraining gas, into the overflow bin 30 where the larger size solid particles separate from the gas and collect in the bin 30, from which they may be removed periodically. The separated gas passes from the bin through vent pipe 31 and filter bag 32 to the atmosphere.

In most operations, samples of material flowing through the transport conduit 1 will be taken periodically. During the periods when samples are not being taken, a portion of the gas-entrained material will flow through the slot 4 and collect in the cap 7, pipe 11 and the portion of the control valve 12 above the valve head. Unless this accumulated material is removed before the next sample is taken, the next sample will be contaminated by the accumulated material and will not be truly indicative of the material flowing through the transport line at the time the sample is taken.

To provide for the purging of the valve 12, pipe 11, cap 7 and sampling tube 2, a high pressure gas purge line 33 communicates with the housing of the control valve 12, just above the valve head thereof. Flow of air under the desired pressure through the purge line 33 is controlled by a suitable valve, shown herein as a solenoid valve 34. When the valve 34 is open, the high pressure purging gas will flow through line 33 and blow any accumulated material out of the upper portion of the control valve 12 and back through pipe 11, cap 12 and sample tube 2 and discharge it through the slot 4 into the flowing stream of material passing through the transport conduit 1. If a sample of material flowing through the transport line is taken shortly thereafter, it will be truly representative of the material flowing through the transport conduit at that instance. It will be understood, of course, that in order to purge the system of accumulated material, the pressure of the purging gas in the transport conduit. To bring about such purging, a pressure in the gas purge line of about 20 pounds p.s.i. greater than that in the transport conduit has been found satisfactory. In many instances, it is desired that the sample of the material flowing through the transport conduit be taken automatically at predetermined intervals. A control circuit for this purpose is shown in FIG. 5 and embodies a timer having a timer switch 35 which controls the opening and closing of switch 36, connected to and controlling the operation of a solenoid 34' of the valve 34 of the gas purge line, and a switch 37 connected to and controlling the operation of a solenoid 15' of solenoid valve 15, which in turn controls the opening and closing of the control valve 12.

When the timer switch 35 is closed, switch 36, after a predetermined interval, will close to energize the solenoid 34' of the air purge valve 34 to open that valve to permit the pressurized gas to flow through line 33 to flush accumulated material from the sampling system. After a predetermined interval, which is sufficient to permit the purging of the sampling system, and also to assure that accumulated material which has been purged from the sampling system and blown into the stream of material passing through the conduit line has passed downstream beyond the sampling tube, switch 36 is opened to de-energize solenoid 34' to shut off the flow of purging air. Shortly after the opening of switch 36, switch 37, which controls the flow of electric current to the solenoid 15' of solenoid valve 15, is closed by the timer and energizes solenoid 15' of valve 15 to deliver air to the inside chamber of the diaphragm control valve, thereby opening that valve to permit a sample of material to pass therethrough and through pipe 18 and conduit 19 to the sample hopper 23. After a predetermined interval, which is sufficient to enable a sample of desired amount to be taken, switch 37 is opened by the timer, thereby de-energizing solenoid 15' to cause a flow of air to the outside of the diaphragm chamber of valve 15 to close the control valve 12 and to stop the taking of the sample. The time during which the gas purge valve 34 and the control valve 12 are maintained open may be regulated to give complete purging, and to provide for the taking of a sample of the desired amount of material flowing through the transport conduit, respectively. Normally the control valve 12 will be maintained open for a sufficient length of time to completely fill the sample compartment 25 so that a sample of the same amount will be taken each time. Any sample material in excess of that necessary to fill the sample compartment 25 will overflow into the overflow compartment 26 and from there into the overflow bin 30.

While the sample hopper 23 has been disclosed and described as having the screen 27 to screen out and reject particles over a predetermined maximum size, so that the sample to be analyzed will be of the desired small particle size, if the failure to include the larger particles in the sample which is analyzed should present any problem, the screen may be eliminated, or the rejected larger particles may be ground to the desired small size and added to the screened sample. This has the advantage over subjecting the entire sample to grinding to bring it to the desired particle size, in that it eliminates the necessity of subjecting the particles which are of the desired small size to further grinding.

While the preferred embodiment of the invention has been described above, it is to be understood that various changes within the skill of the art may be made in the details of the sampling device as herein described without departing from the invention or sacrificing any of the advantages thereof. The scope of the invention is set forth in the appended claims.

I claim:
1. A device for taking a sample from a stream of material flowing through a transport conduit which comprises a sampling tube adapted to extend into a stream of material flowing through the transport conduit and having an opening therein for the flow of sampled material, a valve in said sampling tube for controlling the flow of material passing into said sampling tube through said opening, a conduit for gas under pressure connected to said sampling tube between said valve and said opening, a valve for controlling the flow of gas under pressure through said last-named conduit, and means for opening and closing said valves in a predetermined sequence, with the valve in said gas conduit first being opened, to establish a flow of purging gas through said sampling tube, and then closed, and the valve for controlling the flow of sampled material through said tube then being opened, and thereafter closed.

2. A sampling device as set forth in claim 1, which includes means for maintaining the valve in said gas conduit and the control valve in the sampling tube open for a predetermined length of time.

3. A sampling device as set forth in claim 2, in which the valves in the gas conduit and the sampling tube are solenoid actuated and which includes an electric circuit for automatically actuating said solenoids, said circuit including a switch for each of said valves and a timer for opening and closing said switches in sequence.

References Cited by the Examiner
UNITED STATES PATENTS

| | | | |
|---|---|---|---|
| 2,467,652 | 4/1949 | Beede | 73—422 X |
| 2,636,387 | 4/1953 | McKinney | 73—422 |
| 2,668,447 | 2/1954 | Lenhart | 73—422 |
| 2,742,788 | 4/1956 | Henton | 73—422 |
| 2,965,134 | 12/1960 | Pouppirt | 73—422 X |
| 2,972,246 | 2/1961 | Reinecki et al. | 73—422 X |
| 2,979,956 | 4/1961 | Warren | 73—422 |
| 3,083,577 | 4/1963 | Nelson et al. | 73—422 |

LOUIS R. PRINCE, Primary Examiner.

DAVID SCHONBERG, RICHARD QUEISSER, Examiners.